United States Patent
Wagner et al.

Patent Number: 5,228,885
Date of Patent: Jul. 20, 1993

[54] PROCESS OF CONCENTRATING A DILUTE SULFURIC ACID IN A THREE-STAGE FORCED-CIRCULATION VACUUM EVAPORATION PLANT

[75] Inventors: Hartmut Wagner, Moers; Volker Wichert, Voerde; Roland Fach, Schermbeck; Klaus Engels, Kerken; Günter Okon, Kempen-Tönisberg, all of Fed. Rep. of Germany

[73] Assignee: Metallgesellschaft Aktiengesellschaft, Frankfurt am Main, Fed. Rep. of Germany

[21] Appl. No.: 764,153

[22] Filed: Sep. 20, 1991

[30] Foreign Application Priority Data

Sep. 20, 1990 [DE] Fed. Rep. of Germany ....... 4029737

[51] Int. Cl.$^5$ .................. B01D 1/00; C01B 17/88
[52] U.S. Cl. ........................ 23/306; 203/12; 423/529; 423/531; 423/DIG. 2
[58] Field of Search ............ 23/306, 307; 423/522, 423/529, 530, 531, DIG. 2; 203/7, 12; 204/DIG. 13; 159/47.3

[56] References Cited

U.S. PATENT DOCUMENTS

| | | | |
|---|---|---|---|
| 2,078,088 | 4/1937 | Matius et al. | 23/306 |
| 2,993,757 | 7/1961 | Dasher et al. | 423/DIG. 2 |
| 5,061,472 | 10/1991 | Lailach et al. | 423/531 |

FOREIGN PATENT DOCUMENTS

| | | | |
|---|---|---|---|
| 1152285 | 8/1983 | Canada | 423/529 |
| 1156428 | 11/1983 | Canada | 423/531 |
| 3327769 | 2/1985 | Fed. Rep. of Germany | 423/530 |
| 3632623 | 3/1988 | Fed. Rep. of Germany | 423/522 |

*Primary Examiner*—Michael Lewis
*Assistant Examiner*—Stephen G. Kalinchak
*Attorney, Agent, or Firm*—Michael J. Striker

[57] ABSTRACT

The process of concentrating a dilute sulfuric acid in a three-stage vacuum evaporation plant includes feeding an entry dilute sulfuric acid to a first evaporation stage of a vacuum evaporation plant to form an overhead vapor (6), withdrawing a finally concentrated sulfuric acid from the third evaporation stage (3), using steam or the overhead vapor (6) of the first evaporation stage as a heating fluid in the three-stage vacuum evaporation plant, maintaining the entry dilute sulfuric acid under a pressure of 0.4 to 0.7 bar and at a temperature of 80° to 120° C. in the first evaporation stage (1), maintaining the partially concentrated sulfuric acid under a pressure of 0.02 to 0.06 bar and at a temperature of 50° to 90° C. in the second evaporation stage (2), maintaining the further concentrated sulfuric acid under a pressure of 0.02 to 0.06 bar and at a temperature of 80° to 120° C. in the third evaporation stage (3), and condensing overhead vapors (8,8a) formed in the second and third evaporation stages. Each evaporation stage (1,2,3) includes an evaporation vessel (1b,2b,3b) and a connected recycle line including a shell-tube heat exchanger (1a,2a,3a) and pump. The process also includes continuously feeding about 30 to 95% of the entry dilute sulfuric acid (4) to the first evaporation vessel in the first evaporation stage (1) and continuously feeding the balance of the entry dilute sulfuric acid to the second evaporation vessel in the second evaporation stage (2).

9 Claims, 2 Drawing Sheets

PROCESS OF CONCENTRATING A DILUTE SULFURIC ACID IN A THREE-STAGE FORCED-CIRCULATION VACUUM EVAPORATION PLANT

BACKGROUND OF THE INVENTION

This invention relates to a process of concentrating dilute sulfuric acid, particularly in a three-stage vacuum evaporation plant using forced circulation.

A process of concentrating dilute sulfuric acid is known in which the dilute sulfuric acid is fed to a first stage vacuum evaporation and concentrated sulfuric acid is withdrawn from a third stage vacuum evaporation. Steam and/or overhead vapor are used as a heating fluid in the vacuum evaporator plant using forced circulation. A pressure of 0.4 to 0.7 bar and a temperature of 80° to 120° C. are maintained in the evaporating vessel of the first stage. A pressure of 0.02 to 0.06 bar and a temperature of 50° to 90° C. are maintained in the evaporating vessel of the second stage. A pressure of 0.02 to 0.06 bar and a temperature of 80 to 120° C. are maintained in the evaporating vessel of the third stage. Those overhead vapors, which are not used as a heating fluid, are condensed.

In the production of titanium dioxide by the sulfate process, dilute sulfuric acid, which contains metal sulfates, is formed in large quantities and must be concentrated before it can be recycled to the production process. As a rule, the dilute sulfuric acid formed in the production of titanium dioxide is evaporated by vacuum evaporation to a final concentration of 60 to 70% by weight (calculated without solids, i.e., without taking undissolved salts into account). Multistage vacuum evaporation plants using forced circulation are usually employed for that purpose. Published German Application 33 27 769 describes a process of treating dilute sulfuric acid in a process, which, in a preferred embodiment, includes a concentrating treatment in a three-stage vacuum evaporation plant using forced circulation. The dilute sulfuric acid, which is to be concentrated, is first fed to the first stage and is subjected to a first concentrating treatment therein. The dilute sulfuric acid, which has been concentrated, is subsequently concentrated further in each of the second and third stages. Concentrated sulfuric acid is withdrawn from the third stage.

A disadvantage of that process is that gypsum is formed in the first stage in large quantities and is deposited in the first stage and adversely affects the function of the first stage. These gypsum deposits can be removed only with difficulty and give rise to a need for expensive maintenance work, even after running the process for a short time so that the costs of the process are increased.

SUMMARY OF THE INVENTION

It is an object of the present invention to concentrate dilute sulfuric acid in a three-stage vacuum evaporation plant using forced circulation in a process in which formation of difficultly removable gypsum deposits in the first evaporation stage is avoided and there will be no need for extensive maintenance work, even after running the process for a long time.

These objects and others are attained in a process of concentrating a dilute sulfuric acid in a three-stage vacuum evaporation plant having a first evaporation stage with a first evaporation vessel and a first heat exchanger means, a second evaporation stage with a second evaporation vessel and a second heat exchanger means and a third evaporation stage with a third evaporation vessel and a third heat exchanger means and means for forced circulation of the sulfuric acid. The process comprises feeding an entry dilute sulfuric acid to the first evaporation stage to form an overhead vapor, withdrawing a finally concentrated sulfuric acid from the third evaporation stage, using a heating fluid selected from the group consisting of steam and the overhead vapor of the first evaporation stage in each of the heat exchanger means, maintaining the entry dilute sulfuric acid under a pressure of 0.4 to 0.7 bar and at a temperature of 80° to 120° C. in the first evaporating vessel of the first evaporating stage, maintaining a partially concentrated sulfuric acid under a pressure of 0.02 to 0.06 bar and at a temperature of 50° to 90° C. in the second evaporating vessel in the second evaporating stage, maintaining a further concentrated sulfuric acid under a pressure of 0.02 to 0.06 bar and at a temperature of 80° to 120° C. in the third evaporating vessel in the third evaporating stage, and condensing overhead vapors formed in the second and third evaporating stages.

According to the invention a 30 to 95% portion of the entry dilute sulfuric acid is continuously fed to a first evaporating vessel of a first evaporating stage and the remainder of the entry dilute sulfuric acid is continuously fed to a second evaporating vessel of a second evaporating stage. The entry dilute sulfuric acid to be concentrated usually has a concentration of 20 to 25% by weight. The finally concentrated sulfuric acid withdrawn from a third evaporating stage has a concentration of 64 to 70% by weight (calculated without solids). Each evaporating stage of the three-stage vacuum evaporation plant using forced circulation comprises the evaporating vessel, to which a recycling line containing a circulating pump and a heat exchanger means, advantageously a shell-tube heat exchanger, are connected. The sulfuric acid to be concentrated which is circulated in each evaporating stage has a concentration which is suitable for that evaporation stage The dilute sulfuric acid is slightly superheated in the heat exchanger means and a part of the water is flashed off in the evaporating vessel. The steam used as a heating fluid is usually under a pressure of 1 to 6 bars. Surprisingly it has been found that a formation of the unwanted and difficult-to-remove gypsum deposits in the first evaporation stage is avoided, if the entry dilute sulfuric acid which is to be concentrated is divided and fed in accordance with the above teaching of the invention.

The concentration of the entry dilute sulfuric acid can be increased to 35 to 50% by weight (calculated without solids) in the first evaporation stage, while the concentrations in the second and third evaporation stages are the same as in the process described in Published German Patent Application 33 27 769.

According to a preferred feature of the invention at least a part of the entry dilute sulfuric acid before entering the three-stage vacuum evaporation plant using forced circulation is preheated to 30° to 99° C. in at least one preheater. This reduces the energy consumption of the first evaporation stage.

According to a further feature of the invention the entry dilute sulfuric acid before entering the three-stage vacuum evaporation plant using forced circulation is concentrated to a concentration of 25 to 32% by weight (calculated without solids) by utilizing the process heat.

In that case the entry dilute sulfuric acid can be concentrated at particularly low cost in the three-stage vacuum evaporation plant using forced circulation using the process of the invention.

According to a further preferred feature of the invention steam is used as a heating fluid in the first evaporation stage and in the third evaporation stage and the overhead vapor from the first evaporating vessel of the first evaporating stage is used as a heating fluid in the second evaporating stage. Because of that the process of concentrating dilute sulfuric acid in the three-stage vacuum evaporation plant using forced circulation can be carried out with comparatively low energy consumption.

According to a further feature of the invention the overhead vapors from the second evaporation stage and from the third evaporation stage are separately condensed in at least one condenser associated with each evaporation stage. If the overhead vapors from the second evaporation stage and from the third evaporation stage are separately condensed in at least one condenser associated with each evaporation stage, the condensates of the overhead vapors from the second evaporation stage and from the third evaporation stage can be separately subjected to further processing depending on their differing pollutant composition.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
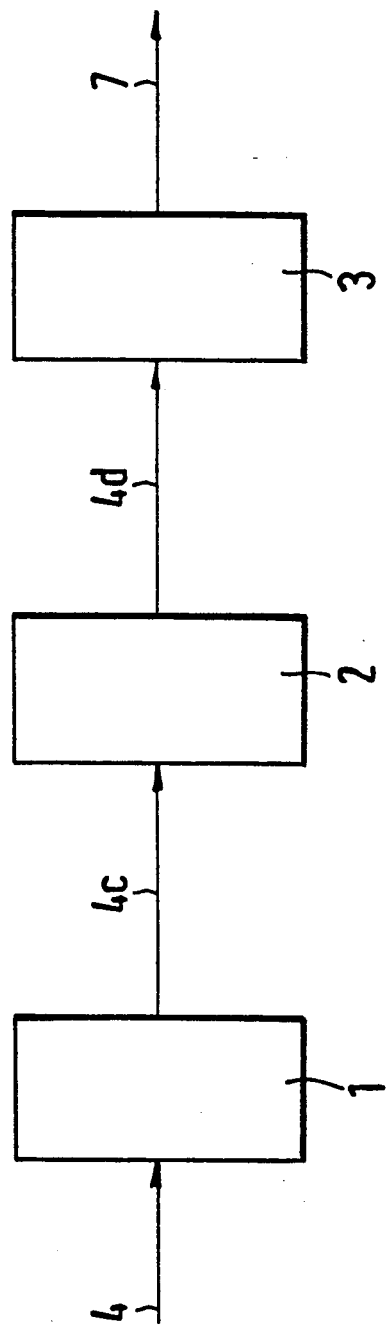
FIG. 1 is a flow chart of a preferred embodiment of the process described in Published German Patent Application 33 27 729 in a three-stage vacuum evaporation plant using forced circulation.

FIG. 1 is a simplified flow chart of a preferred embodiment of a prior art process described in German Published Patent Application 33 27 769 in a three-stage vacuum evaporation plant using forced circulation. As described in that reference all of the entry dilute sulfuric acid 4 is fed to a first evaporation stage 1 and is withdrawn from the first evaporation stage as a partially concentrated sulfuric acid 4c, which is subsequently fed to a second evaporation stage 2 and is further concentrated therein to form a further concentrated sulfuric acid 4d. The further concentrated sulfuric acid 4d is withdrawn from the second evaporation stage 2 and is concentrated in the third evaporation stage 3 to the desired final concentration of 67% by weight (calculated without solids). Finally concentrated sulfuric acid 7 is withdrawn from the third evaporation stage 3.

Figure 2:
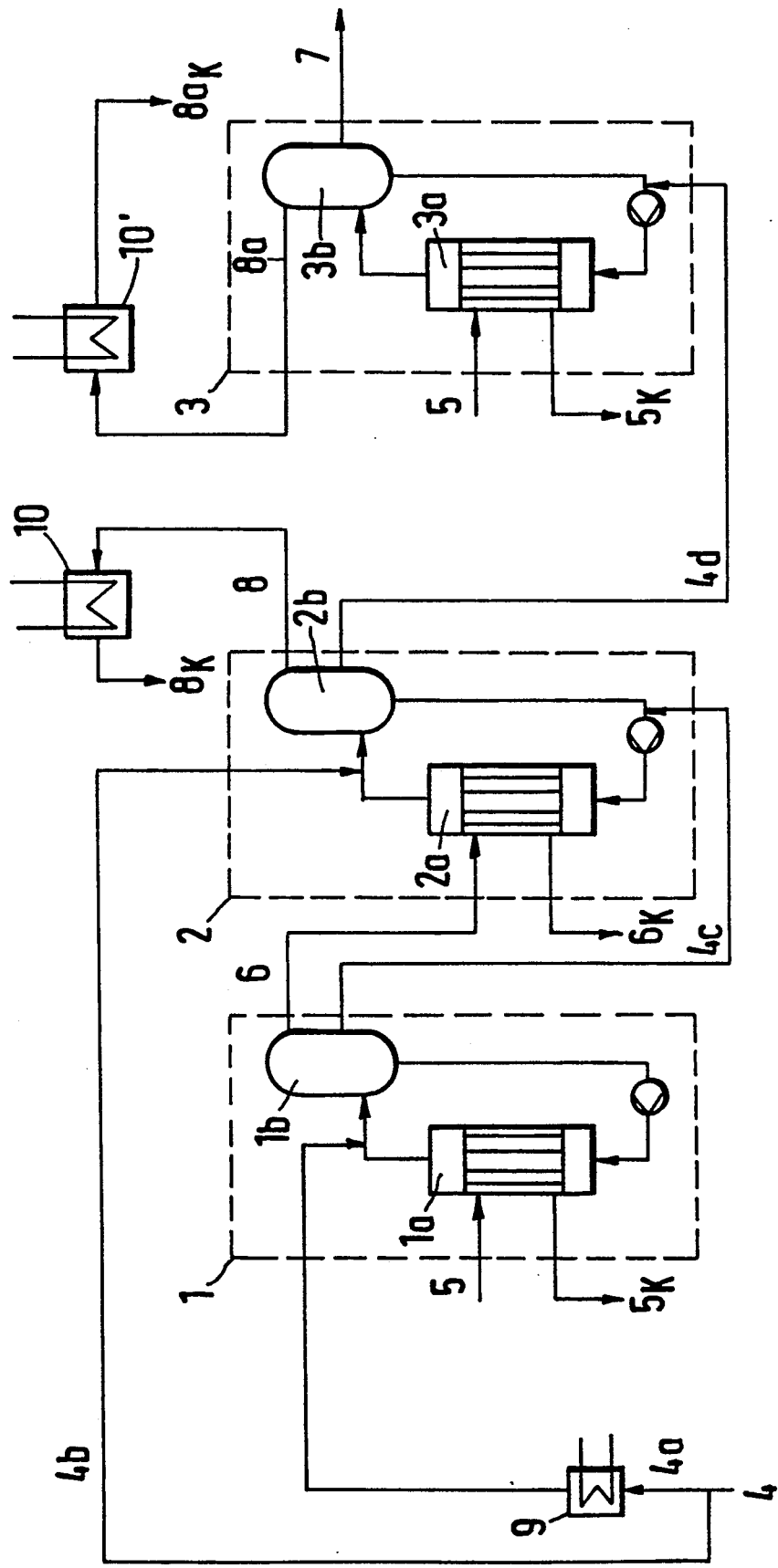
FIG. 2 is a flow chart of a preferred embodiment of the process according to the invention.

FIG. 2 is flow chart of the process according to the invention carried out in a three-stage vacuum evaporation plant using forced circulation. A part 4a of the entry dilute sulfuric acid 4 is preheated in a preheater 9 and is subsequently fed to a first evaporating vessel 1b of the first evaporation stage 1. A first shell-tube heat exchanger 1a of the first evaporation stage 1 is heated by heating steam 5, which is withdrawn as a condensate $5_K$ from the first shell-tube heat exchanger 1a. The first evaporating vessel 1b of the first evaporating stage 1 is connected by a recycling line, which includes a circulating pump, to the first shell-tube heat exchanger 1a.

Each of the second and third evaporation stages 2 and 3 comprises a circulating pump and a second and third shell-tube heat exchanger 2a or 3a arranged in the same manner as in the first evaporation stage 1 connected by a recycle line with the respective evaporation vessels 2b and 3b. The partially concentrated dilute sulfuric acid 4c is withdrawn from the first evaporating vessel 1b and is then fed to the second evaporation stage 2. An overhead vapor 6 from the first evaporation stage 1 is withdrawn from the first evaporation vessel 1b and is used as a heating fluid in the second evaporation stage 2 and is condensed in the second shell-tube heat exchanger 2a to form a condensate $6_K$, which is withdrawn from the first shell-tube heat exchanger 2a. The remaining part 4b of the entry dilute sulfuric acid is directly fed to the second evaporation stage 2. The further concentrated dilute sulfuric acid 4d is withdrawn from the second evaporating vessel 2b and fed to the third evaporation stage 3, which is heated by steam 5, which is withdrawn as a condensate $5_K$ from the third shell-tube heat exchanger 3a. The overhead vapors 8 and 8a from the second and third evaporating vessels 2b and 3b are separately fed to respective condensers 10 and 10' and are condensed therein and the resulting condensates $8_K$ and $8a_K$ are withdrawn. The finally concentrated sulfuric acid 7 is withdrawn as the final product from the third evaporating vessel 3b.

The subject matter of the invention is described below in more detail with reference to the following example:

Entry sulfuric acid 4 having an initial concentration of 24.4% by weight is fed at a rate of 33,000 kg/h to a three-stage vacuum evaporation plant using forced circulation and is concentrated therein. A part 4a of the dilute sulfuric acid fed at a rate of 17,800 kg/h is heated in a preheater 9 from 25° to 99° C. and is then continuously fed to the first evaporation stage 1. A pressure of 0.65 bar and a temperature of 117° C. are maintained in the first evaporating vessel 1b of the first evaporation stage 1. A partially concentrated dilute sulfuric acid 4c having a concentration of 42.3% by weight (calculated without solids) is withdrawn from the first evaporating vessel 1b of the first evaporation stage 1 and is fed to the second evaporation stage 2. The remaining entry dilute sulfuric acid 4b is continuously fed at a rate of 15,200 kg/h to the second evaporation stage 2. The mixture of the partially concentrated dilute sulfuric acid 4c and the dilute sulfuric acid 4b is concentrated in the first evaporating vessel 2b of the second evaporation stage to a concentration of 52.6% by weight (calculated without solids). A pressure of 0.05 bar and a temperature of 71° C. are maintained in the first evaporating vessel 2b of the second evaporation stage 2. While the first shell-tube heat exchanger 1a of the first evaporation stage 1 is heated by heating steam 5 fed in at a rate of 7,500 kg/h, the second evaporation stage 2 is heated by overhead vapor 6, which is withdrawn from the first evaporating vessel 1b of the first stage 1 at a rate of 6,500 kg/h and fed to the second shell-tube heat exchanger 2a of the second evaporation stage 2. The partially concentrated dilute sulfuric acid 4d concentrated to 52.6% by weight (calculated without solids) is withdrawn from the second evaporation vessel 2b of the second evaporation stage 2 and is fed to the third evaporation stage 3, which is heated by steam 5 fed to the third shell-tube heat exchanger 3a at a rate of 4,200 kg/h. A pressure of 0.05 bar and a temperature of 110° C. are maintained in the third evaporating vessel 3b of the third evaporation stage 3. In the third evaporation stage 3, the partially concentrated dilute sulfuric acid 4d is concentrated further to a concentration of 67.7% by weight 9 calculated without solids) and is withdrawn as a finally concentrated sulfuric acid 7 from the third evaporating vessel 3b of the third evaporation stage 3. The overhead vapors 8 and 8a formed in the second evaporation stage 2 and the third evaporation stage 3 are withdrawn from the respective evaporating vessels 2b and 3b and are subsequently condensed.

The entry dilute sulfuric acid can be an aqueous solution of sulfuric acid.

We claim:

1. In a process of concentration a dilute sulfuric acid in a three-stage vacuum evaporation plant having a first evaporation stage with a first evaporation vessel and a first heat exchanger means, a second evaporation stage with a second evaporation vessel and a second heat exchanger means and a third evaporation stage with a third evaporation vessel and a third heat exchanger means and means for forced circulation of the dilute sulfuric acid, said process comprising feeding an entry dilute sulfuric acid to the first evaporation stage to form an overhead vapor, withdrawing a finally concentrated sulfuric acid from the third evaporation stage, using a heating fluid selected from the group consisting of steam and said overhead vapor of the first evaporation stage in each of said heat exchanger means, maintaining the entry dilute sulfuric acid under a pressure of 0.4 to 0.7 bar and at a temperature of 80° to 120° C. in the first evaporating vessel of the first evaporating stage, maintaining a partially concentrated sulfuric acid under a pressure of 0.02 to 0.06 bar and at a temperature of 50° to 90° C. in the second evaporating vessel in the second evaporation stage, maintaining a further concentrated sulfuric acid under a pressure of 0.02 to 0.06 bar and at a temperature of 80° to 120° C. in the third evaporating vessel in the third evaporating stage, and condensing overhead vapors formed in the second and third evaporating stages, the improvement comprising continuously feeding about 30 to 95% of the entry dilute sulfuric acid to the first evaporating vessel of the first evaporating stage and continuously feeding a remainder of the entry dilute sulfuric acid not fed to the first evaporating vessel of the first evaporating stage to the second evaporating vessel of the second evaporating stage.

2. The improvement as defined in claim 1, further comprising preheating the about 30 to 95% fraction of the entry dilute sulfuric acid to 30° to 99° C. in at least one preheater prior to entry into the first evaporation stage of the three-stage vacuum evaporation plant.

3. The improvement as defined in claim 1, further comprising generating a process heat and concentrating the entry dilute sulfuric acid to a concentration of 25 to 32% by weight calculated without solids using the process heat, before entry into the three-stage vacuum evaporation plant.

4. The improvement as defined in claim 1, wherein the steam is used as the heating fluid in the first heat exchanger means of the first evaporation stage and in the third heat exchanger means of the third evaporation stage and said overhead vapor from the first evaporating vessel of the first evaporation stage is used as the heating fluid in the second evaporation stage.

5. The improvement as defined in claim 4, further comprising separately condensing the overhead vapors from each of the second and third evaporation stages in at least one condenser associated with each of said second and third evaporation stages.

6. The improvement as defined in claim 1, wherein the entry dilute sulfuric acid is an aqueous solution of sulfuric acid containing 20 to 25% sulfuric acid.

7. A process of concentrating a dilute sulfuric acid in a three-stage vacuum evaporation plant having a first evaporation stage including a first evaporation vessel and a first heat exchanger means connected to the first evaporation vessel, a second evaporation stage including a second evaporation vessel and a second heat exchanger means connected to the second evaporation vessel and a third evaporation stage including a third evaporation vessel and a third heat exchanger means connected to the third evaporation vessel and means for forced circulation of the sulfuric acid, said process comprising the steps of:

a. feeding from 30 to 95% by weight of an entry dilute sulfuric acid tot he first evaporation stage;

b. heating the entry dilute sulfuric acid fed to the first evaporating stage in step a) in the first heat exchanger means with heating steam;

c. forming an overhead vapor of the first evaporation stage in the first evaporation vessel at a pressure of 0.4 to 0.7 bar and at a temperature of 80° to 120° C.;

d. withdrawing a partially concentrated dilute sulfuric acid from the first evaporation vessel and feeding the partially concentrated sulfuric acid to the second evaporation stage;

e. feeding a remaining part of the entry dilute sulfuric acid directly to the second evaporation stage;

f. heating the partially concentrated sulfuric acid and the remaining part of the entry dilute sulfuric acid in the second heat exchanger means with the overhead vapor of the first evaporation stage formed in the first evaporation vessel;

g. withdrawing a further concentrated sulfuric acid from the second evaporation vessel of the second evaporation stage;

h. feeding the further concentrated sulfuric acid withdrawn from the second evaporation vessel to the third evaporation stage;

i. heating the further concentrated sulfuric acid in the third heat exchanger means with said steam;

j. forming an overhead vapor in the second evaporation vessel of the second evaporation stage at a pressure of 0.02 to 0.06 bar and at a temperature of 50° to 90° C.;

k. forming an overhead vapor in the third evaporation vessel of the third evaporation stage at a pressure of 0.02 to 0.06 bar and at a temperature of 80° to 120° C.;

l. condensing the overhead vapors formed in the second and third evaporation vessels; and k. withdrawing a finally concentrated sulfuric acid from the third evaporation vessel in the third evaporation stage.

8. The process as defined in claim 7, further comprising preheating the about 30 to 95% fraction (4a) of the entry dilute sulfuric acid to 30° to 99° C. in at least one preheater prior to entry into the first evaporation stage.

9. The process as defined in claim 7, further comprising generating a process heat and concentrating the entry dilute sulfuric acid to a concentration of 25 to 32% by weight calculated without solids using the process heat, before entry into the three-stage vacuum evaporation plant.

* * * * *